Figures 1, 2:
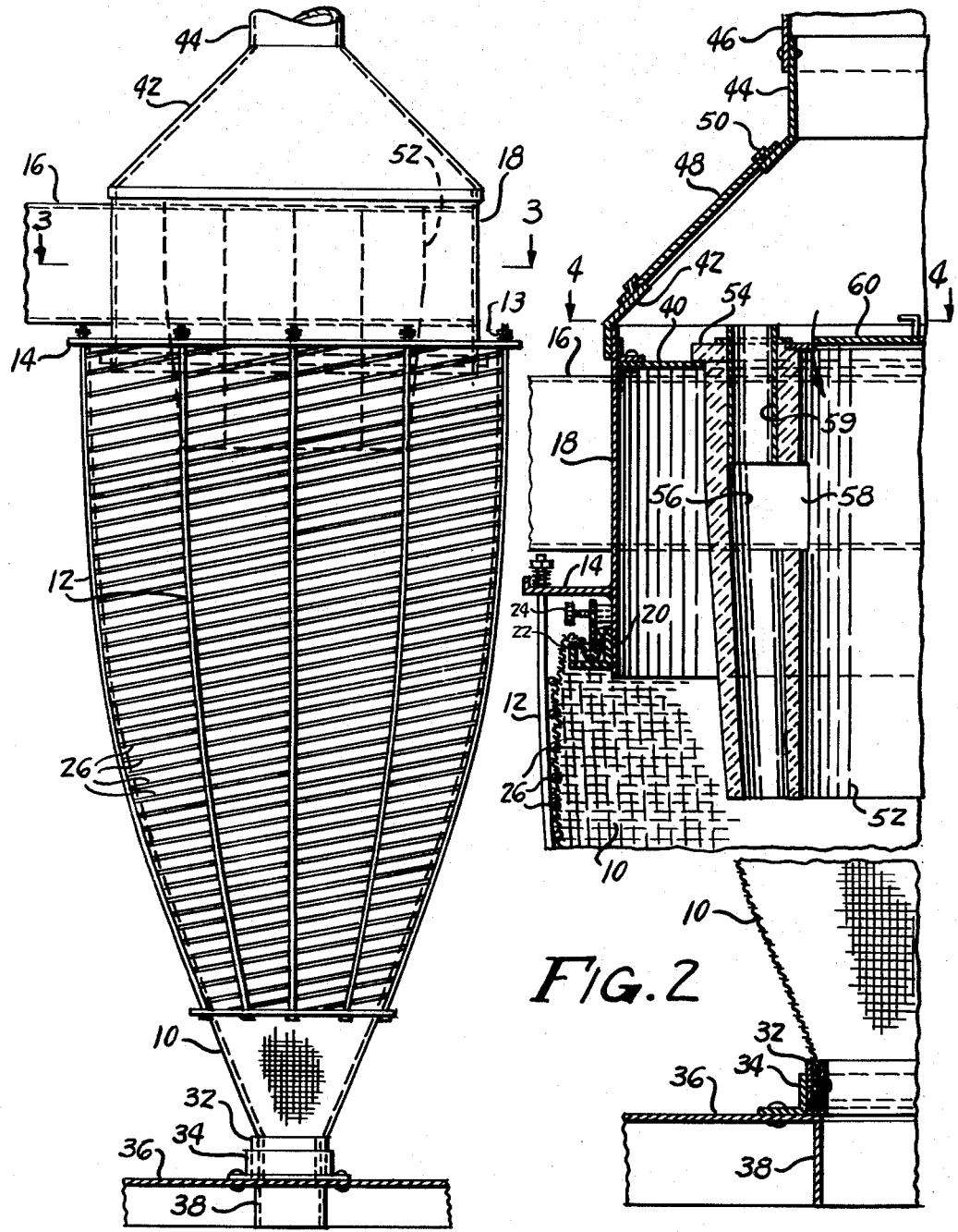

March 8, 1966  T. W. HOPWOOD  3,238,705
DUST SETTLING CYCLONE DEVICE
Filed Feb. 8, 1963  2 Sheets-Sheet 1

INVENTOR.
THOMAS W. HOPWOOD
BY
Walter S. Pawl,
ATTORNEY.

March 8, 1966 T. W. HOPWOOD 3,238,705
DUST SETTLING CYCLONE DEVICE
Filed Feb. 8, 1963 2 Sheets-Sheet 2
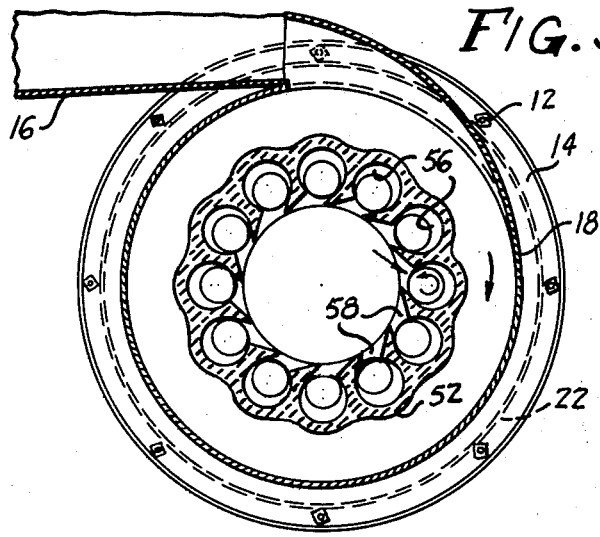
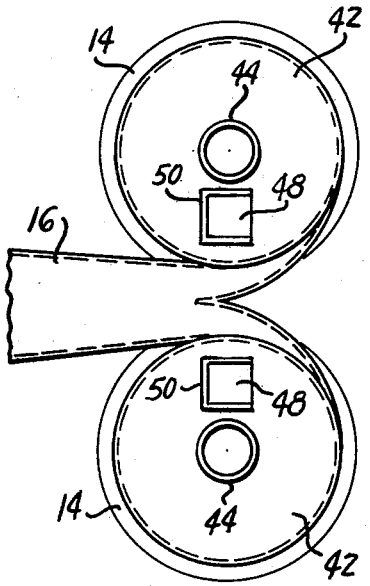
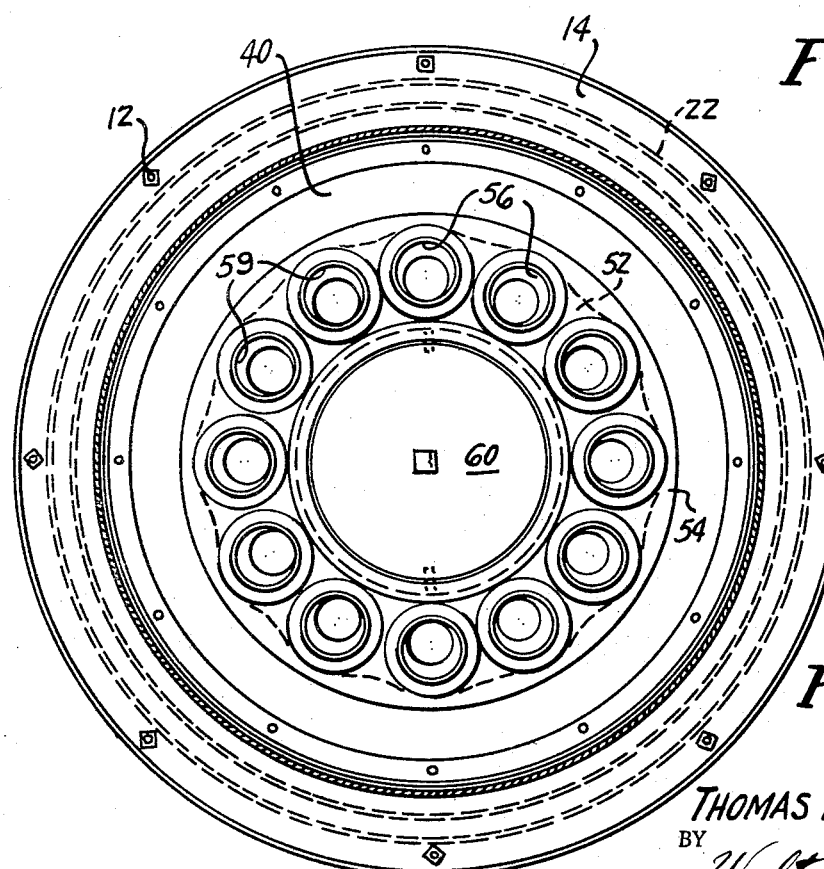
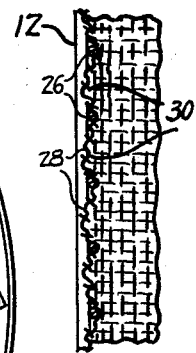
INVENTOR.
THOMAS W. HOPWOOD
BY
Walter S. Paul.
ATTORNEY.

United States Patent Office 3,238,705
Patented Mar. 8, 1966

3,238,705
DUST SETTLING CYCLONE DEVICE
Thomas William Hopwood, P.O. Box 538, Giddings, Tex.
Filed Feb. 8, 1963, Ser. No. 257,268
6 Claims. (Cl. 55—343)

This invention relates to apparatus for separation of dust particles suspended in an air or other gaseous stream, which might also be heated and very heavily laden with moisture.

The prior art covering this subject of the separation of solid particulate matter in the air stream is well known. These particles are usually described as dusts and are usually of one micron in size or larger, but in the present disclosure consideration is given to finer particles which include much smaller particle sizes, commonly known as fumes and smoke.

The important physical properties of the dust particles which affect their behavior in an air stream are size, shape and weight.

The well-known types of dust separation from an air or other gaseous suspension fluid stream are known as gravitational, inertial and centrifugal. The type presently disclosed is primarily of centrifugal nature.

In centrifugal type collectors, radial acceleration or the resulting centrifugal force is utilized to separate the dust particles from the air or other gas stream. The centrifugal settling velocity which is the outward or radial velocity of a dust particle in a centrifugal collector can be expressed by the following equation for particles within the Stokes law range:

$$Vc = \frac{av}{K} d^2 \left(\frac{\rho - \rho_0}{\mu}\right) \frac{Vt^2}{R}$$

When $Vc$ = centrifugal settling velocity.
$Vt$ = tangential velocity of a particle.
$R$ = radius of the circular path of a particle.
$d$ = diameter of the particle.
$\rho$ = density of the particle.
$\rho_0$ = density of the fluid medium.
$\mu$ = viscosity of the fluid medium.
$K$ = a constant which varies as the particle shape and is $3\pi$ for spheres.
$av$ = a constant depending on the shape of the particle.

Centrifugal type collectors are usually classified as low velocity cyclones and high velocity cyclones. The present invention deals with improvements which can be applied to both low and high velocity cyclones inasmuch as they are similar in principle and conform to Stokes law.

The dust laden air or other gas stream usually enters the collector at a lower velocity, but the velocity is continually increased as it rotates down through the unit until it reaches the vortex near the dust outlet, where the cleaned air or gas starts rotating up in an inner air column. Since at this point the tangential velocity is high and the radius of the path small, a great centrifugal force is developed to separate the dust from the air. Therefore better collection of fine dust is obtained by cyclone designs that have higher resistance to air flow.

The well-known centrifugal type collectors are primarily adaptable to dry dust laden air or gas streams in which a water content of not more than 15% is present, the reason being that more moisture will in many cases cause the particles to adhere to the usual metal wall surface of the collector and dust from the air stream, will build up large wet accumulations of dust particles and therefore block the passage of the air or gaseous stream, hence the efficiency of the cyclone and attached machinery is diminished greatly.

The principal object of this invention is to provide a device which might for convenience be described as a cyclone tower, giving high resistance to the dust laden air or other gases entering at the top of the cyclone on its spiral centrifugal path to its vortex. This high resistance is accomplished by providing continuous trough depressions of a spiral nature in the cyclone wall. This spiral can be of variable pitch, usually being small to provide maximum length of path to the vortex. This is accomplished by making the walls of the cyclone of a flexible material such as rubber, canvas and similar flexible materials, which when subjected to the pressure of the centrifugal gaseous or air streams, take the maximum surface shape permitted by a spiral wire cage, by bulging outwardly between the turns of the spiral wire to form spiral grooves in the cyclone wall. These grooves may be made uneven by having vertical support rods spaced around the outside of the spiral wire connecting the turns of the wire together to provide rigidity to the cage and to provide humps over these rods in the grooves where the flexible wall bulges out between these humps in an uneven groove. This spiral cage is hung from hooks attached to a firm support by means of small strong wire springs thereby giving added vibration to the total unit, and forming an added factor to resistance required. Due to the outward pressure of the air stream against the flexible material, which is also pressing against the spiral metal cage, a continuous trough is thus made, having a series of humps over the vertical support rods of the cage to provide the spiral path with an uneven surface. The wall material may be provided with a rough surface thereby giving further high resistance to air flow.

Another object of this invention is to provide the spiral path with a cross-section contour to provide interference of each particle with other particles, giving further high resistance to the air flow.

Another object of this invention is that the flexible cyclone wall material, when under deflation and hanging loosely in the cage, can be shaken in a simple manner at the lower end and the dust adhering quickly removed.

Another object of this invention is to provide cyclone walls of a flexible material which will not permit any appreciable amount of moisture and dust accumulation to adhere to and clog up the cyclone.

Another object of this invention is to provide a monolithic annular molded unit which is mounted centrally in the cyclone unit and forms the walls against which the gaseous spiralling effluent presses, the annular unit being formed to provide a series of smaller cyclones within its annular wall which permit passage of the effluent so that further cleansing of the effluent is accomplished before final discharge of the effluent from the cyclone unit.

Other and more specific objects will become apparent in the following detailed description of a preferred form of the invention as illustrated in the accompanying drawings, wherein:

FIG. 1 is an elevational view of a cyclone dust settling device made in accordance with the present invention, FIG. 2 is an enlarged sectional view of the upper and lower portions of this device, FIG. 3 is a sectional plan view taken on the line 3—3 in FIG. 1, FIG. 4 is an enlarged sectional plan view taken on the line 4—4 of FIG. 2, FIG. 5 is a sectional detail view of a portion of the cyclone wall and cage, and FIG. 6 is a plan view of a pair of these cyclone devices fed by a common delivery conduit.

One way of carrying out the objects of this invention is illustrated as a cyclone device which is provided with a flexible bag 10 having substantially the shape shown in FIG. 1, with a correspondingly shaped wire cage formed by a spiral wire rigidly supported by a series of vertical rods 12 spaced around the outside of the wire and preferably fixed to each turn of the wire.

The wire cage may be fixed or attached by springs 13 at the top to a support flange 14 around the cylindrical upper portion 18 of the device, just below the delivery conduit 16 leading tangentially thereinto. The top of the bag 10 is sealed around the lower end 20 of this cylindrical portion 18 by means of a grooved ring 22 and clamp screws 24. The bag 10 hangs freely inside the spiral wire, but preferably may be slightly oversize in horizontal dimensions with respect to those of the cage, so that pressure exerted by the spiralling flow within the cyclone wall will produce outward spiral bulges of the flexible bag material between the turns of the spiral wire 26 constricted to some extent intermittently along the spiral by the vertical support rods 12. Thus, spiral grooves 28 are formed internally in the wall of the cyclone, with humps 30 where the bulges are constricted by support rods 12. The grooves thus tend to provide guide paths for the circulating gas fluid while retarding the speed of the flow by means of the humps 30. The inner surface of the flexible wall material should preferably be of a rough nature so as to provide further retardation to the flow. The flexible material should be such as will not permit any appreciable amount of wet particle accumulation to adhere to and clog up the cylinder. For this purpose it might be desirable to select a material, such as canvas or other fabric material.

The bottom of the bag may be tubular and may be sealed to an outlet ring 32 which fits into a floor collar 34 on the support platform 36 leading to a discharge outlet 38. This outlet ring 32 may be provided with a control valve (not shown) for passing the pulverized product to pumps, storage bins, conveyors, etc., that may be brought under the discharge outlet 38.

When deflated, the bag 10 may be shaken by removing the collar 34 with the control valve closed and shaking the lower end of the bag vigorously to shake loose the material clinging to the inner wall of the bag all the way up to its suspension ring 22. The lower end of the bag may then be reconnected to the floor collar 34.

The upper cylindrical portion 18 may be provided with an inwardly extending annular cover flange 40 at the upper end thereof at a level above the inlet opening thereinto from the delivery conduit 16. The top of the cylindrical portion 18 is covered by a domed outlet casing 42 having a conical wall with a central opening at the top connected to the discharge conduit 44. The discharge conduit may exhaust the cleaned air or other gas into the atmosphere; or if it is a valuable gas, it may be recaptured through a conduit connection 46 for recirculation or for storage. A slidable access door 48 may be mounted in the grooved door frame 50 in the conical wall.

A monolithic annular molded unit 52 is mounted centrally within the opening formed by the inner edge of the cover flange and is suspended therefrom by means of the outer flange 54 at its upper edge, the unit 52 extending downwardly into the cyclone below the lower end 20 of the cylindrical portion 18. The annular unit 52 is formed to provide a series of smaller cyclones 56 within its annular wall and extending vertically therethrough. The effluent from the large cyclone passing upwardly through the center of the annular unit 52 can pass if desired into the flow of the smaller cyclones 56 through passages 58. The external peripheral surface of the annular unit 52 may be vertically grooved between the smaller cyclones to lighten this unit as well as to provide further retardation to the spiral flow of the gas around its exterior wall. The effluent from each small cyclone passes through unit 59 which is a loose flanged sleeve made of metal, plastics or rubber. The central opening in the annular unit 52 may be closed by a damper valve 60 to direct the entire flow into the smaller cyclones, where it is further cleansed before it passes up into the domed outlet and is discharged.

Many obvious modifications may be made in the details and arrangement of parts without departing from the spirit and scope of the present invention as defined in the appended claims.

What is claimed is:

1. A dust separating cyclone device comprising a vertical substantially cylindrical upper casing having a tangential inlet for dust-laden gaseous fluid flow at high velocity, a centrally open cover on said casing, an effluent outlet conduit extending downwardly through said central opening into the central portion of said device, and a bag of flexible substantially impervious material sealed to the lower end of said upper casing and converging downwardly to a discharge opening at its bottom for discharging the dust collected at the bottom, said bag converging mildly in its upper portion and more rapidly toward the bottom to form a substantially bulged out inverted conical cyclone wall when inflated, and a spiral wire cage around the outside of the bag substantially conforming to the shape of said bag when inflated by the high velocity dust-laden gaseous fluid but of slightly smaller dimensions to cause the bag to bulge outwardly between adjacent turns of the spiral wire thus forming spiral guide grooves for the dust-laden gaseous fluid entering the upper casing of the cyclone device.

2. A cyclone device as defined in claim 1, said cage having substantially vertical rods spaced around the outside of the spiral wire and fixed thereto to form a rigid cage structure and to constrict the spiral bulges of the wall at corresponding intervals along each bulge, so as to provide intermittent humps in the guide grooves on the inside of the cyclone wall for further retarding the dust-laden gas flow as it spirals downwardly therealong.

3. A cyclone device as defined in claim 1, said cage being suspended by springs to the upper casing means including said springs to provide for vibratory movements to the cyclone wall for preventing the accumulation of dust thereon.

4. A cyclone device as defined in claim 1, the outer surface of said effluent outlet conduit having substantially vertical grooves spaced peripherally around the conduit to provide further retardation to the flow of the dust-laden gases as they circle around the outside of the conduit.

5. A cyclone device as defined in claim 4, a discharge dome over said upper casing and a series of annularly spaced small cyclones within the wall of said effluent outlet conduit, having tangential inlet ports for receiving portions of the effluent gas flow in said conduit for further cleaning before passing upwardly to said discharge dome.

6. A cyclone device as defined in claim 5, and a damper valve over the top of said effluent conduit for diverting the entire flow in the effluent conduit into said small cyclones through said tangential ports when said damper valve is fully closed.

References Cited by the Examiner

UNITED STATES PATENTS

| 1,416,995 | 5/1922 | Stroud | 55—343 |
| 1,821,202 | 9/1931 | Birkholz | 55—378 |
| 2,316,353 | 4/1943 | Moorhead | 55—378 |
| 2,351,864 | 6/1944 | Linderman | 55—399 |
| 2,530,112 | 11/1950 | Arnold | 55—399 |
| 2,612,236 | 9/1952 | Vedder | 55—378 |
| 3,034,647 | 5/1962 | Giesse | 55—435 |

REUBEN FRIEDMAN, *Primary Examiner.*